June 19, 1951     J. E. SALMIVUORI     2,557,799

HYDRAULIC DRIVE MECHANISM

Filed March 1, 1951

INVENTOR.
Johannes E. Salmivuori
BY
Lyman E. Dodge
ATTORNEY.

Patented June 19, 1951

2,557,799

UNITED STATES PATENT OFFICE 2,557,799

HYDRAULIC DRIVE MECHANISM

Johannes Erkki Salmivuori, Malmo, Sweden

Application March 1, 1951, Serial No. 213,449
In Sweden August 23, 1948

3 Claims. (Cl. 74—720)

This invention relates to power transmission, particularly to a clutch and more especially to an hydraulic clutch.

A principal object of this invention is to provide a device by which a driving member may be connected to a driven member by an hydraulic clutch transmitting power directly above a certain speed and transmitting power through gearing at a speed below the given speed.

A further object of the invention is the production of a device of the type specified in which there will be but one body of hydraulic fluid and one actuating device for that hydraulic fluid.

Other objects and advantages will appear as the description of the particular physical embodiment selected to illustrate the invention progresses and the novel features will be particularly pointed out in the appended claims.

Figure 1:
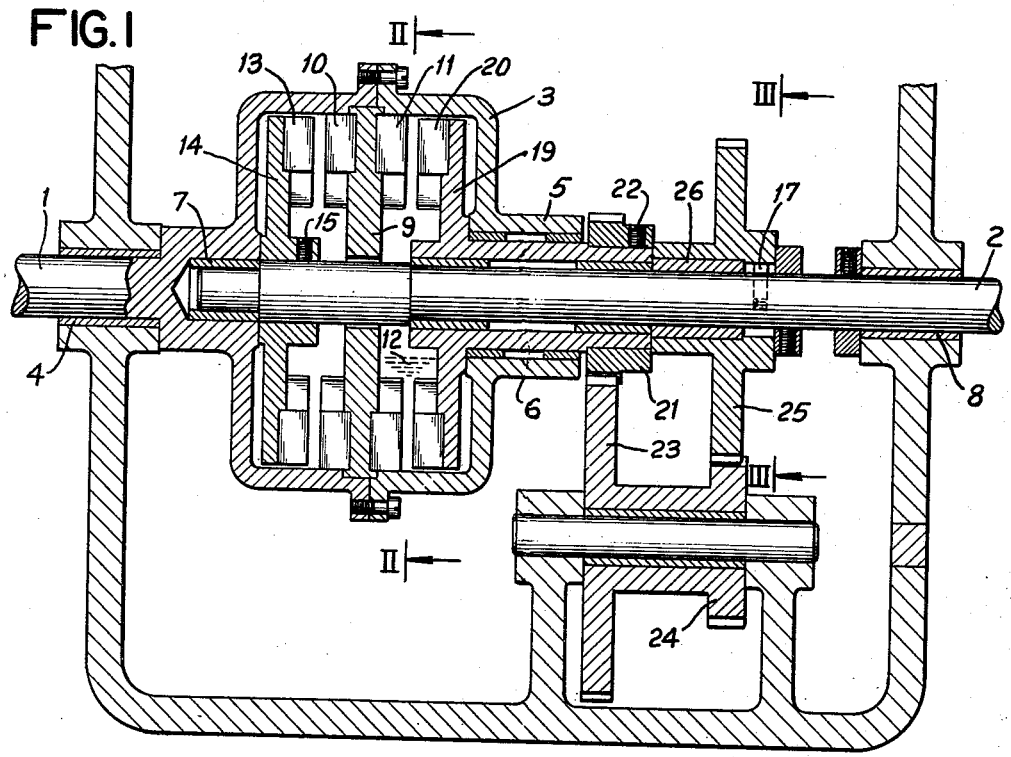
Figure 2:
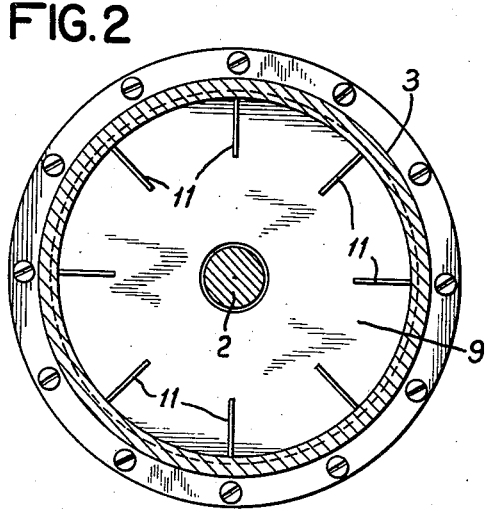
Figure 3:
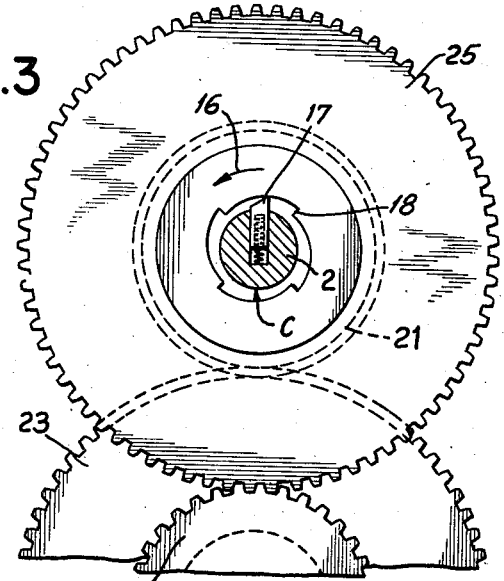

In describing the invention in detail and the particular physical embodiment selected to illustrate the invention, reference will be had to the accompanying drawings and the several views thereon, in which like characters of reference designate like parts throughout the several views, and in which:

Fig. 1 is a cross sectional view of a device embodying my invention; Fig. 2 is a cross sectional view of the device as shown by Fig. 1 on the plane indicated by the line II—II viewed in the direction of the arrows at the ends of the line; Fig. 3 is a fragmentary cross sectional view of the device as shown by Fig. 1 on the plane indicated by the line III—III viewed in the direction of the arrows at the ends of the line.

As a form illustrating my invention, I have shown in Fig. 1, a driving shaft 1. This shaft may be connected to any suitable source of power.

Fig. 1 illustrates a driven shaft 2 which may be connected to any device which it is desired to actuate by power.

The driving shaft 1 may be considered as connected to the engine of an automobile and the driven shaft 2 may be considered as the propelling shaft of an automobile or the connection to the rear driving wheels thereof.

3 designates a substantially hollow cylindrical body which is directly connected to the driving shaft 1 and may be considered as integral therewith so that at one end it is supported in the bearing 4. At the other end, the cylinder 3 is supported by the extension 5 which is rotatably mounted on a sleeve 6 which is in turn rotatably mounted upon the shaft 2.

It will be seen from the above description that the cylinder 3, in effect, rotates about the shaft 2 and its longitudinal center line of rotation is coincident with the longitudinal center line of rotation of shaft 2.

The shaft 2 is supported at one end in the bearing 7 formed in the hub of the cylinder 3 and at the other end by the fixed bearing 8.

Within the cylinder 3 is a partition member 9 which is in the form of a disc and is connected to and moves with the cylinder 3. This partition divides the cylinder 3 into two chambers. The partition disc 9 is provided with wings or vanes as 10 and 11, one on one side of the disc and the other on the other side of the disc. These vanes are distributed in proper number and proper spacing about the outside edge of the disc 9, as best shown in Fig. 2.

The cylinder 3 is filled with a viscous fluid 12 such as oil which surrounds all of the parts within the cylinder. The chambers are in connection by the space between the partition and the shaft 2.

When the shaft 1 is rotated, thus rotating cylinder 3, the disc 9 with the wings as 10 and 11 is rotated so that the rotation of the hydraulic fluid in the cylinder acts upon wings, as 13. These wings 13 project from the face of a disc 14 which is attached to and rotates with shaft 2. This connection may be any suitable or appropriate connection as a blind set-screw 15.

The rotation of disc 9 causes a rotation of disc 14 and so of shaft 2.

If shaft 2 is rotating by reason of the rotation of disc 14 and a resistance is encountered to the rotation of shaft 2 then that speed of rotation is decreased below a predetermined speed. Supposing the shaft to be rotating in the direction of the arrow 16 of Fig. 3, there will come a time when the end of the spring clutch 17 contacts the shoulder 18 of its complementary member. When this occurs, the shaft 2 may then be driven by means of disc 19. When shaft 2 is driven by means of disc 19, it is driven because the moving fluid in the cylinder 3 actuated by vanes, as 11, work on vanes 20 on disc 19 and causes it to rotate. When disc 19 rotates through the sleeve 6, it rotates the spur gear 21 which is attached as by blind set-screw 22 to the sleeve 6 formed, preferably, integral with disc 19. Spur gear 21 meshes with and actuates gear 23 which, preferably, formed integral with gear 24, moves that gear. Gear 24 is in mesh with gear 25 which is journalled on a collar 26 surrounding shaft 2.

Gear 25 embodies, preferably integrally therewith, an over-running or free wheeling clutch designated as a whole by C. This clutch is such, as will be perfectly evident from the inspection of Fig. 3, that when the shaft 2 rotates in the direction of the arrow 16, it rotates freely without interfering with gear 25, but when shaft 2 decreases in speed so that 25 is moving faster than shaft 2, then 25 will drive the shaft 2, because 17 will contact with a shoulder as 18 on the gear 25.

It will thus be seen that when the resistance to shaft 2 is not sufficient to decrease its speed below a certain amount, shaft 2 will be driven by disc 14, but if the resistance encountered by shaft 2 is such as to decrease its speed sufficiently, then the driving of shaft 2 will be taken up by disc 19 and the driving will be through a gear reduction.

The gear reduction between disc 19 and shaft 2 can be any ratio desired. A gear ratio of 4 to 1 would be appropriate.

It also should be understood that when the resistance to turning of shaft 2 decreases and its speed increases there will come a time when it will be driven by disc 14, that is, disc 14 may then drive shaft 2 so rapidly that it turns in the direction of the arrow 16 faster than gear 25 and so rotates independently of gear 25 and more rapidly.

From the hereinbefore given description it will now be understood that I have provided a means of power transmission including a clutch which depends upon the motion of an hydraulic fluid, and that I move that hydraulic fluid by one rotating disc having vanes on each side thereof and that juxtaposed to these vanes on each side of the driving disc, I have positioned drivable discs and that under certain conditions of speed of the driven member one of these discs will do the driving, but under other conditions the other disc will do the driving and through a gear reduction, and that the shift from one to the other is entirely automatic.

I desire to have it understood that I have illustrated my invention in its simplest form, but I do not intend to exclude by my description the use of modifications thereof such as movable vanes, or longitudinal movement of cylinder 3 to make a change in the action of the device.

Although I have particularly described one particular physical embodiment of invention and explained the construction and principle thereof, nevertheless, I desire to have it understood that the form selected is merely illustrative, but does not exhaust the possible physical embodiments of the idea of means underlying my invention.

What I claim as new and desire to secure by Letters Patent is:

1. An hydraulic clutch, including, in combination, a cylindrical container, an hydraulic fluid filling said container, a partition in said container dividing it into two chambers, said partition attached to said cylinder to rotate therewith, a shaft to be driven passing longitudinally through said cylinder, a disc provided with vanes connected to said shaft and positioned in one of the chambers, a disc provided with vanes positioned in the other chamber and supported by and rotatable about said shaft, a gear wheel surrounding said shaft and rotatable thereabout, gearing connections between said last mentioned disc and said last mentioned gear, an over-running clutch positioned between said last mentioned gear and said shaft whereby the shaft may rotate in one direction independently of the last mentioned gear and where, when the last mentioned gear is moving more rapidly than the shaft, it will drive the shaft.

2. An hydraulic clutch, including, in combination, a hollow body containing an hydraulic fluid, a partition in the hollow body dividing the hollow body into two chambers, said partition provided with vanes on each side thereof, means for rotating the hollow body, a drivable shaft, a disc provided with vanes in one of the chambers, said disc rigidly connected to said shaft, a second disc provided with vanes in the other chamber, a gear connected to said shaft by an over-running clutch and gears connecting said second disc with said gear whereby at one speed of the shaft one disc will drive it and at another speed the other will drive it.

3. An hydraulic clutch, including, in combination, a hollow cylinder containing an hydraulic fluid, a partition formed with vanes on each side thereof within the hollow cylinder dividing the cylinder into two chambers, vaned discs, one in each chamber, a shaft, one of the discs rigidly connected to the shaft, a train of gears and a free wheeling clutch between the other disc and the shaft and means for rotating the cylinder whereby the shaft is driven by one or the other discs, in accordance with the relative speeds thereof.

JOHANNES ERKKI SALMIVUORI.

REFERENCES CITED

The following references are of record in the file of this patent:

UNITED STATES PATENTS

| Number | Name | Date |
| --- | --- | --- |
| 2,173,729 | Ruth | Sept. 19, 1939 |
| 2,189,537 | Swennes | Feb. 6, 1940 |
| 2,239,129 | Szekely | Apr. 22, 1941 |
| 2,427,432 | Wilhelmy | Sept. 16, 1947 |
| 2,488,478 | Roberts | Nov. 15, 1949 |
| 2,499,059 | Foos | Feb. 28, 1950 |